United States Patent [19]

Haeussler

[11] Patent Number: 5,115,684
[45] Date of Patent: May 26, 1992

[54] FLOWMETER FOR MEASURING THE RATE OF FLUID FLOW IN A CONDUIT

[75] Inventor: Hubert Haeussler, Neuheim, Switzerland

[73] Assignee: Barmag AG, Remscheid, Fed. Rep. of Germany

[21] Appl. No.: 608,538

[22] Filed: Nov. 2, 1990

[30] Foreign Application Priority Data

Nov. 6, 1989 [DE] Fed. Rep. of Germany ....... 3936844

[51] Int. Cl.$^5$ ................................. G01F 1/24
[52] U.S. Cl. ..................... 73/861.48; 73/861.54
[58] Field of Search .......... 73/861.53, 861.54, 861.55, 73/861.48

[56] References Cited

U.S. PATENT DOCUMENTS

| 2,069,309 | 2/1937 | Henszey | 73/861.54 |
|---|---|---|---|
| 3,112,646 | 12/1963 | English | 73/861.54 |
| 3,415,119 | 12/1968 | Moore | 73/861.54 |
| 4,194,394 | 3/1980 | Bartholomaus | 73/861.54 |
| 4,205,592 | 6/1980 | Haüssler . | |
| 4,235,105 | 11/1980 | Walters | 73/861.53 |
| 4,304,136 | 12/1981 | McCabe et al. . | |
| 4,315,436 | 2/1982 | McCabe et al. . | |
| 4,381,699 | 5/1983 | Häussler . | |
| 4,475,407 | 10/1984 | Kruncos | 73/861.53 |

FOREIGN PATENT DOCUMENTS

| 99712 | 2/1984 | European Pat. Off. . | |
|---|---|---|---|
| 3505706 | 8/1986 | Fed. Rep. of Germany ... | 73/861.53 |
| 2658928 | 11/1987 | Fed. Rep. of Germany . | |

Primary Examiner—Herbert Goldstein
Attorney, Agent, or Firm—Bell, Seltzer, Park & Gibson

[57] ABSTRACT

The flowmeter includes a piston that is biased by a spring to a neutral position within an encircling collar, and the piston is movable relative to the collar by and in the direction of the fluid flow to be measured. Movement of the piston relative to the collar increases the fluid flow through through one or more slots provided in one of such components. A Hall device senses movement of a magnet connected to the piston, and produces an output signal. A linear relationship between the output signal and the rate of flow of the fluid can be achieved by utilization of a magnetic member whose magnetic intensity or cross-sectional shape varies along its length, or by causing the magnet to move along a curve or other path of travel that varies its distance from the probe of the Hall device.

12 Claims, 5 Drawing Sheets

FLOWMETER FOR MEASURING THE RATE OF FLUID FLOW IN A CONDUIT

This invention relates to the measurement of the rate of flow of fluid within a conduit, pipe or other housing. The invention more specifically relates to a flowmeter of the general type disclosed in German Patent 26 58 928 and corresponding U.S. Pat. No. 4,205,592.

BACKGROUND OF THE INVENTION

The flowmeter of the above-identified patents include a piston that is movable against the force of a spring. The displacement of the piston of the flowmeter is converted to an electric output signal by a potentiometer. As is known, the relationship between the output signal and the displacement of the piston is linear. As it is displaced, the piston of the flowmeter varies the size of a displacement-dependent, variable outlet cross-section, which must be designed such that a linear relationship exists between the displacement of the piston and the flow rate. As a result, the influence of the spring characteristic on the flow rate is compensated. For this reason, a linear relationship exists between the rate of flow and the output signal of the potentiometer. Otherwise the flowmeter would not be suited for use a hydraulic control loop.

The use of such a flowmeter may entail certain disadvantages. In the case of a laminar flow, i.e., low rates of flow, the range of the boundary layer of friction is greater than in the case of a turbulent flow. As a result, the relationship between the quantitative throughput and the output signal becomes nonlinear between the range of low flow rates and the range of higher flow rates due to the discontinuity of the transition from a laminar to a turbulent flow and vice versa. Also, a very strong dependence on viscosity results from temperature fluctuations, and the thereby caused viscosity fluctuations, that occur in operation. Finally, in a flowmeter of the type disclosed in the above referenced patents, wherein a potentiometer is used as the signal generator, the potentiometer itself would have to be made of a conductor, in which the conductance varies over the length. It would be conceivable to direct the output signal of the potentiometer to an intermediate circuit having electronic components which convert the output voltage of the potentiometer one more time such that a nonlinear relationship is produced between the output signal of this intermediate circuit and the displacement of the piston in the flowmeter, in such a manner as to compensate for the nonlinear relationship between the displacement of the piston and the rate of flow.

OBJECTS OF THE INVENTION

An object of the invention is to provide an improved flowmeter for measuring the rate of flow of fluid in a conduit or other housing.

Another object of the present invention is to provide a flowmeter in which the ratio of the wetted circumference to the cross section of the flow changes as little as possible in the measuring range and moreover is small, but in which, nonetheless, a linear relationship exists between the measured rate of flow and the output signal in the measuring range. A "wetted circumference," as that term is here used, is the line curve which limits the cross section of the flow, such as, for example, the circumference of the measuring piston and the circumference of the pipe or other housing in the cross section of the flow which is controlled by the measuring piston.

SUMMARY OF THE INVENTION

The above and other objects and advantages of the present invention are achieved in the embodiments illustrated herein by the provision of a flowmeter which comprises a control collar mounted within the housing between the ports of the housing, a piston mounted for axial movement within the collar, and biasing means for biasing the piston to a neutral position relative to the collar, while permitting axial displacement of the piston relative to the collar in response to changes in the rate of flow of the fluid within the housing. The collar and the piston have cooperating wall surfaces which form a passageway between the collar and piston of increasing size as the piston moves from the neutral position in the direction of fluid flow, and displacement measuring and electric signal generator means is provided for measuring the displacement of the piston and for generating an electric output signal having a nonlinear relationship to said displacement of the piston, and having a substantially linear relationship to the rate of flow of the fluid.

In the illustrated embodiments of the present invention, the cooperating wall surfaces of the collar and piston include a cylindrical peripheral wall portion which has at least one radial slot therethrough, with the slot being located adjacent one end of the peripheral wall portion so as to form the above noted passageway. Also, in one preferred embodiment, the piston includes the cylindrical peripheral wall position, so that the wall portion moves axially with respect to the fixed surrounding collar when the piston moves, and in another preferred embodiment, the collar includes the cylindrical peripheral wall portion, and the wall portion is tubular so as to slidably receive the piston therein.

The aforesaid displacement measuring and electric signal generating means preferably utilizes the well known Hall effect, and includes a magnet that is mechanically connected to the piston of the flowmeter, such connection illustratively being via the piston rod. The magnetic field of the permanent magnet vertically crosses a straight, current carrying conductor. As a result, a Hall voltage develops perpendicularly to the direction of the current and to the magnetic field, which is proportional to the strength of the magnetic field and serves as an output signal. This output signal varies with the movement of the piston and the magnet connected thereto. The Hall device can without any additional electrical or electronic means generate an output signal having a linear relationship to the flow rate when measures are taken to compensate for the influence of the spring characteristics of the piston biasing means upon the relationship between the flow rate to be measured and the output signal. One way of achieving this result is by preselected partial magnetization of the magnet in a manner which causes the Hall device to generate an output signal which is nonlinear in relation to the piston displacement and that compensates for the influence of the spring force of the biasing means. Partial magnetization of the magnet is a simple procedure which can be reproduced with great accuracy.

DESCRIPTION OF THE DRAWINGS

Embodiments of the invention are described below, with reference to the accompanying drawings in which.

DESCRIPTION OF THE ILLUSTRATED EMBODIMENTS

Figure 1:
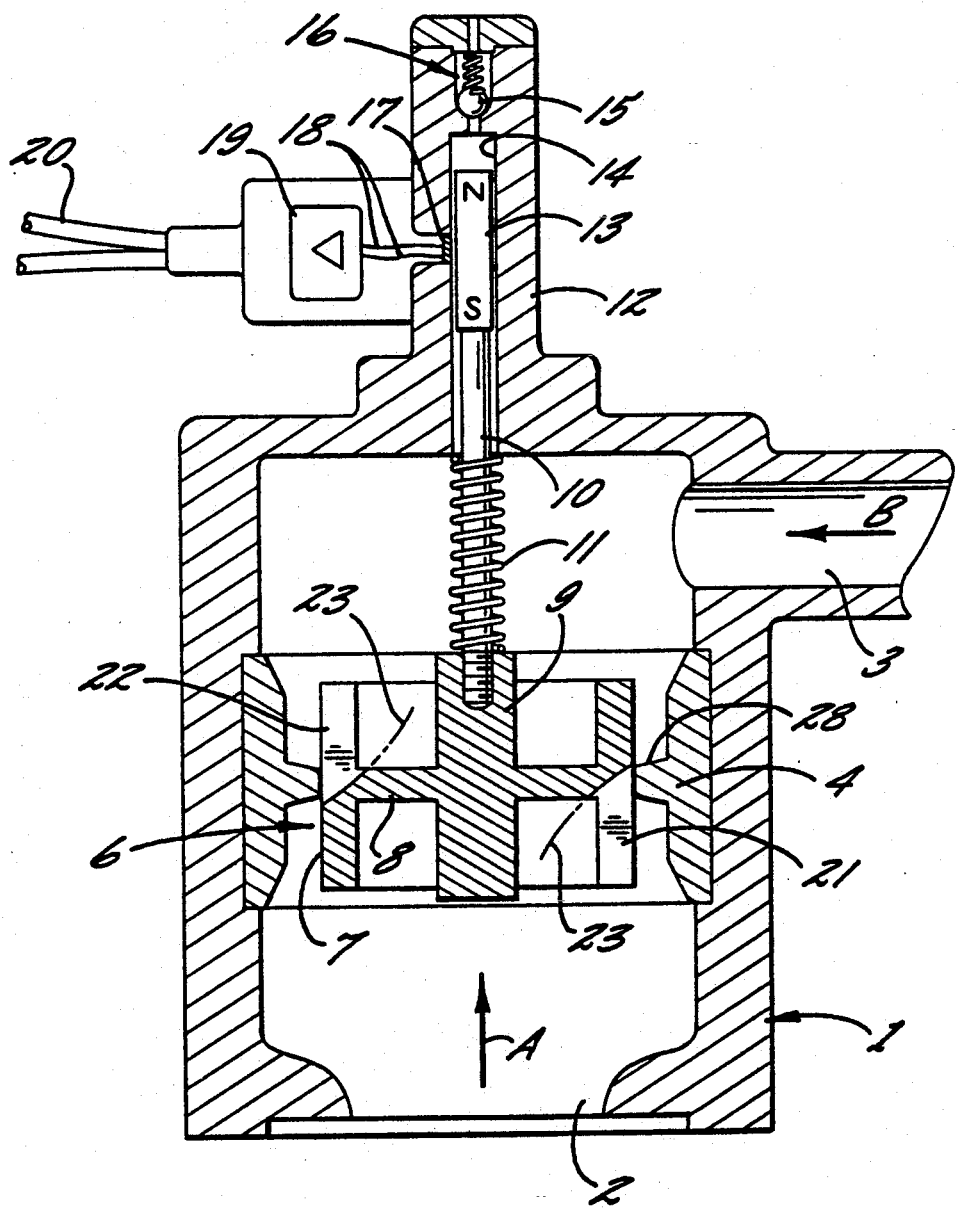
FIG. 1 is a longitudinal sectional view of a flowmeter in accordance with the invention, the section through the piston of the flowmeter being displaced 90° for purposes of illustration.
Figure 2:
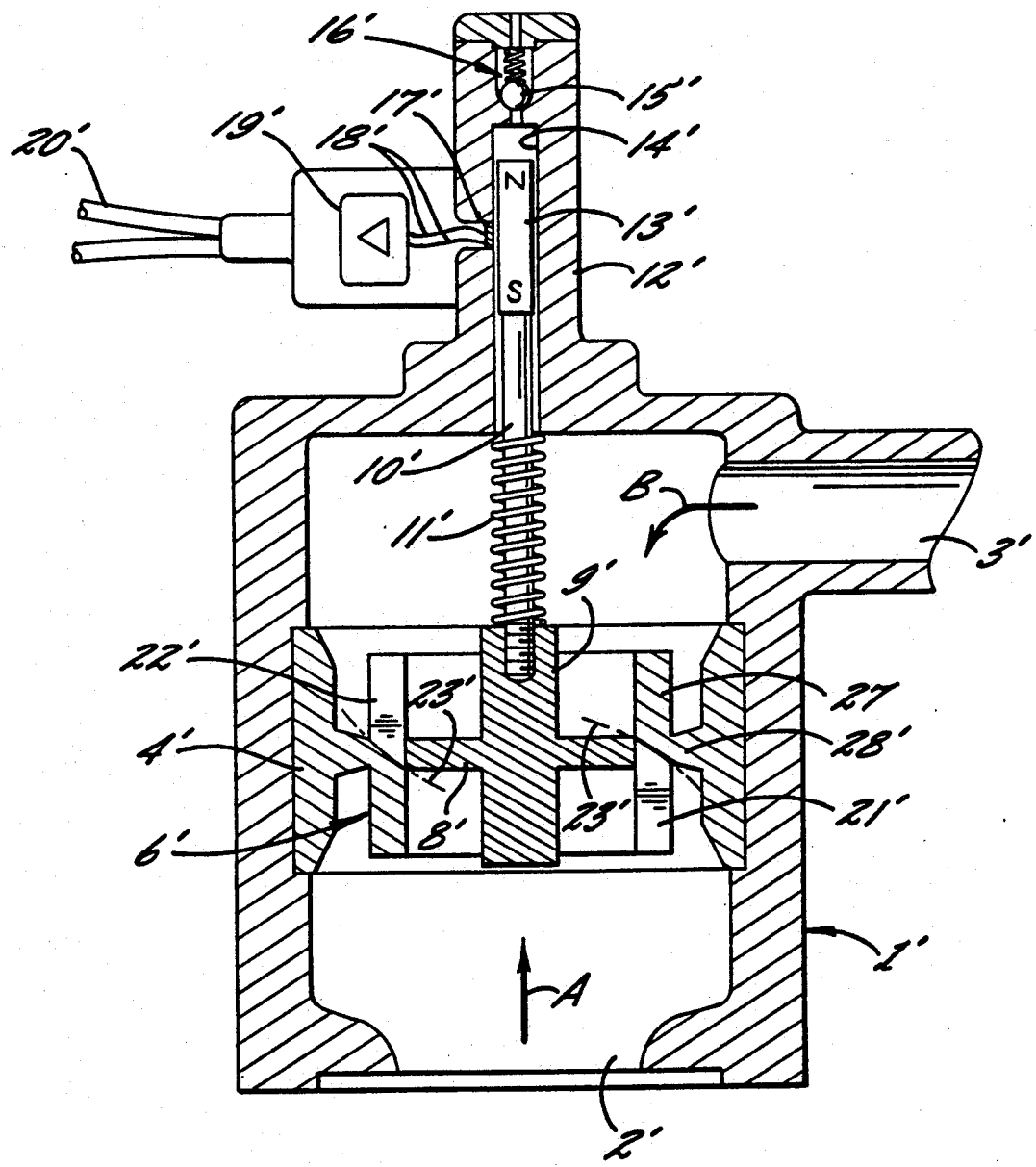
FIG. 2 is a longitudinal sectional view, similar to FIG. 1, of a further embodiment of the flowmeter.

The flowmeter embodiments in FIGS. 1 and 2 of the drawings are similar in many respects, and components in the FIG. 2 embodiment that are identical or similar to components in the FIG. 1 embodiment are identified by the same reference numerals with the addition of a prime designation. Specific differences between the two embodiments will be identified.

In FIG. 1, the numeral 1 designates the housing of a flowmeter having inlet and outlet line connections or ports 2, 3. Fluid flow in the direction of either the arrow A or the arrow B is possible. A collar 4 encircles the interior of housing 1 at a location intermediate ports 2, 3. A measuring piston 6 is disposed within and is slidably movable axially of collar 4, and defines therewith a narrowest gap section of housing 1. The cross section of the fluid flow through the narrowest gap section of housing 1 increases when the piston moves in the direction of flow A or in the direction of flow B. Details of the construction of the piston and of the narrowest cross section of the housing will be discussed below. An actuating rod 10 has its lower end portion attached to piston 6. A piston-supporting spring 11 encircling rod 10 biases piston 6 to its neutral position illustrated in FIG. 1, wherein the piston blocks the narrowest section of the housing completely, or almost completely, when no external forces are operative on the piston, i.e., when there is no pressure differential upon the piston and flow is absent. Flow of fluid either in the direction A or in the direction B moves piston 6 axially in the direction of such flow, against the force of spring 11.

The upper end portion of rod 10, and a magnetic rod 13 secured to it, are guidably received for movement within an elongate end cavity 14 of a measuring extension 12 of housing 1. As seen in FIG. 1, the poles of the magnetic rod 13 are aligned in the direction of its movement. Air is bled from cavity 14 by a check valve 16 having a spring-biased ball 15. Attached to measuring extension 12 is a piston displacement measuring and electric signal generating means. Such means includes the magnetic rod 13 which extends in the direction of movement of the rod, and a Hall sensor device. The Hall sensor device utilizes the well known Hall effect and it includes a probe 17 that is adjacent magnetic rod 13, and through which an electric current flows in one (longitudinal) direction, and in which an electric voltage dependent on the magnetic field of rod 13 is generated in the other (transverse) direction. This measuring voltage is transmitted via lines 18 to an amplifier 19, so that the output signal present in output lines 20 represents the position of piston 6 and thus a measure of the flow rate in the direction of flow A or B.

Figure 3:
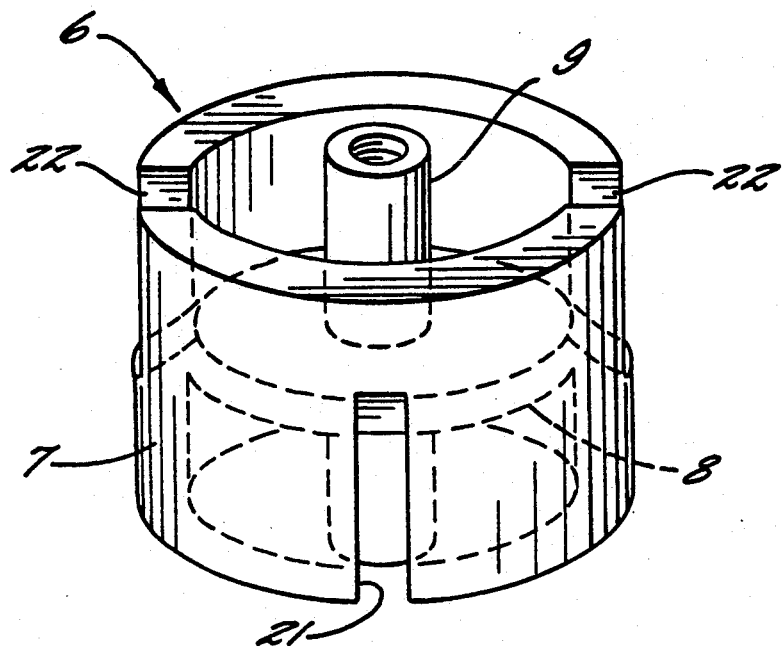
FIG. 3 is a top perspective view of the measuring piston of the flowmeter of FIG. 1.

The collar 4 within housing 1 of the embodiment of FIG. 1 has a ring 28 upon its inner circumferential surface. The piston 6 of the FIG. 1 embodiment of the flowmeter has a tubular outer section 7 which is closed by a cover or wall s that extends transversely of tubular section 7 at approximately the axial midpoint thereof. A post 9 projecting from the central part of wall s is firmly connected to rod 10. Tubular piston section 7 is slidably movable in the direction of its central axis, and forms with the ring 28 of collar 4 the narrowest section of housing 1. Tubular section 7 is provided with slots 21, 22 which each extend from an end of tubular section 7 to its transversely extending wall 8. The aforesaid slots are each cut into tubular piston section 7 by a milling tool, which produces milling circles designated by the numeral 23. Due to the use of a side-milling cutter, the slot walls are each formed by opposing surfaces, and each slot has a rectangular shape. The slots 21 within one end of tubular section 7 are angularly displaced relative to each other and relative to the slots 22 in the other end of tubular section 7, as is best shown in FIG. 3 of the drawings.

In the embodiment of FIG. 2, to which reference is now made, piston 6' does not have an outer section corresponding to section 7 of the piston 6 shown in FIG. 1. However, the housing collar 4' has an axially extending integral tubular section 27 that is fixedly connected to the ring 28' and which is axially aligned with the direction of flow A and B through the housing. The periphery of the tubular section 27 contains slots 21', 22' which each extend from one or the other of the free ends of section 27 to the plane of the centrally disposed ring 28'. The slots in each end portion of tubular section 27 are angularly displaced from each other and from the slots in the other end portion of such section. The slots 21', 22' are cut into the tubular section 27 by a side milling tool, the milling circles of which are designated by the numeral 23'. The use of the milling cutter causes the slot walls to be formed by surfaces which impart a rectangular shape to each slot. The rectangular slot shape results in a nonlinear relationship between the displacement of the piston 6' and the rate of flow of the fluid within housing 1'. The displacement of the piston and the flow rate are therefore not proportional to each other, since the spring characteristic, i.e., the relationship between the piston displacement and the spring force, does not become noticeable as a disturbing factor.

Proportionality between the fluid flow rate and the output signal conducted from Hall device via line 20 can be achieved in different ways according to the present invention. One possibility would be to design the electronic amplifier 19 of the device in such a manner that a nonlinear relationship exists between the measuring signal from probe 17 and the output signal on line 20, so that the nonlinear relationship between the flow rate and the displacement of piston 6 (FIG. 1) is compensated for by the nonlinear relationship between the measuring signal from probe 17 and the output signal on line 20.

Another possibility, which can be pursued by modern magnet manufacturing techniques, and which permits good reproducibility in manufacture and good stability in long-term behavior, is to vary the magnetization of the cylindrical magnetic rod 13 or 13' over its length.

To this end, it is possible to effect differential magnetization of the cylindrical magnetic rod over its length.

Figure 4:
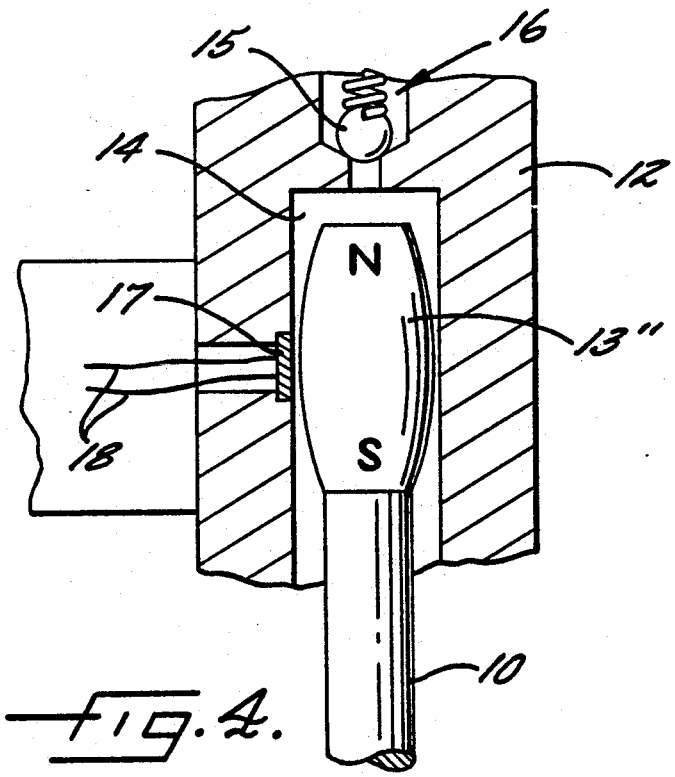
FIG. 4 is a fragmentary view, partially in vertical section and partially in elevation, of another embodiment of a magnet component of the flowmeter, and of components adjacent thereto.

This is facilitated when the magnetic rod is manufactured by a sintering method. It is also possible to produce a magnetic rod, such as that designated by the numeral 13" in FIG. 4, having a variable cross-sectional shape along its length. The particular curvature of the magnetic rod will of course depend upon the particular use or installation. FIG. 4 is merely illustrative of the principle. It is also possible for the magnetic rod to be narrow in its central portion between its north and south poles.

Another possibility would be to curve the magnetic rod, or the surface thereof facing Hall probe 17, over its length in a manner changing its distance from Hall probe 17 during displacement of the piston, and thus changing the influence of the magnetic field on the Hall probe and thus the relationship between the piston displacement and the output signal on line 20.

Figure 5:
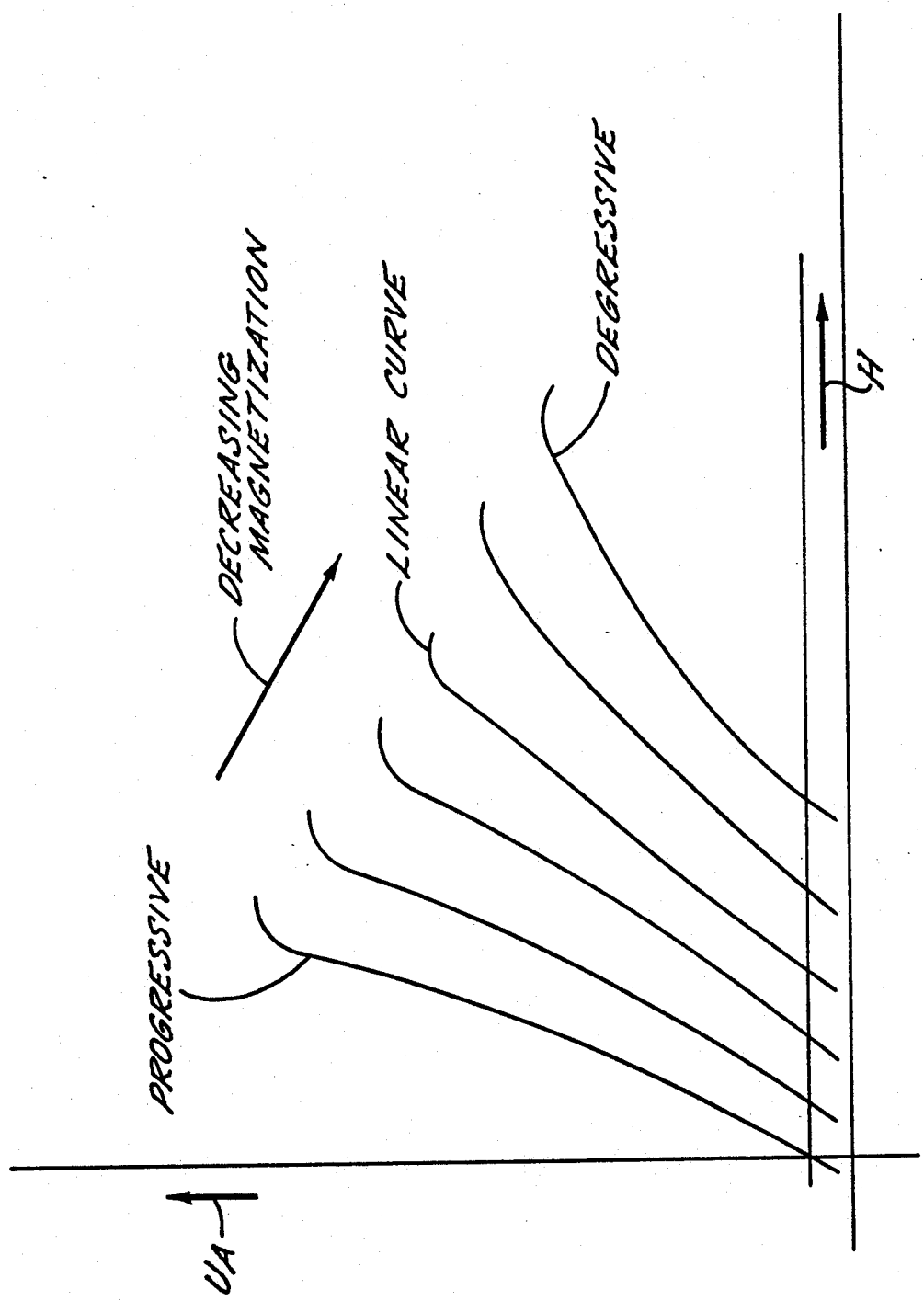
FIG. 5 is a diagram of the output voltage of a Hall device over the piston displacement of a flowmeter having a magnet with partial magnetization.

Another possible way of modifying the relationship between the path of the permanent magnet and the Hall probe would be to utilize a magnet that is homogeneous over its entire length but only partially magnetized, e.g., one that is first magnetized to saturation and then partially demagnetized as, for example, by application of an alternating current. FIG. 5 of the drawings shows a family of curves, of different steepness and slope, that reflect the different characteristics achievable between the output signal of the Hall probe and the piston displacement as a result of partial demagnetization of the permanent magnet. As is indicated by FIG. 5, in the case of full magnetization the output signal $U_A$ of the Hall device increases progressively with the displacement H of the piston (6 or 6') of the magnet (13 or 13'), whereas in the case of a large demagnetization a degressive relationship develops. Partial demagnetization is selected and effected such that the resulting characteristic corresponds substantially to the spring characteristic at an inverse ratio. This compensates for the influence of the spring characteristic on the output signal, and provides a linear relationship between the flow rate and the output signal on line 20 of the Hall device. Partial demagnetization permits use of a cylindrical magnet which is movable along the path at a constant distance from the Hall probe. Furthermore, no additional electrical or electronic means are required.

Figure 6:
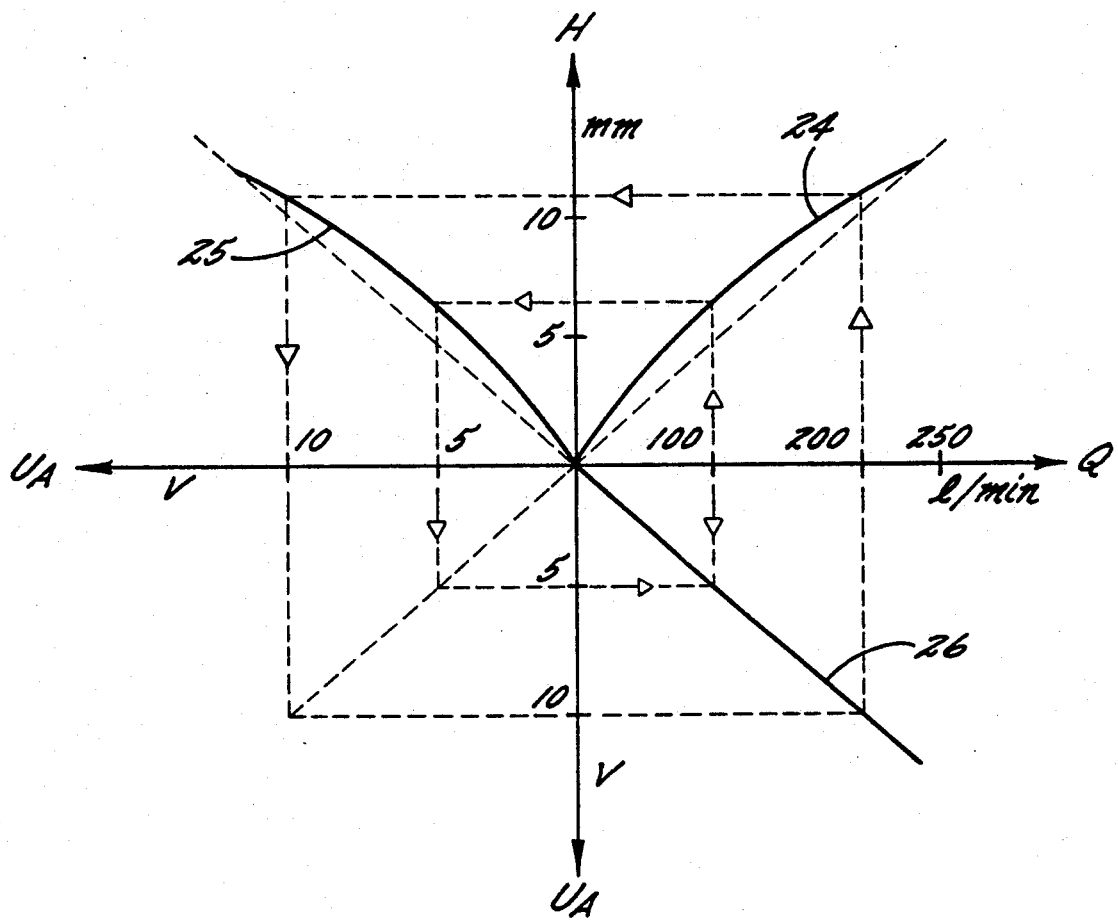
FIG. 6 is a diagram of the output voltage of the Hall device over the flow rate.

As is further indicated in FIG. 6 of the drawings, the characteristic selected is one compensating for the nonlinear relationship between the piston displacement H and the flow rate Q. By way of example, an operating point with a flow rate of 100 liters per minute is illustrated. Due to the fact that the spring force of spring 11 or 11' increases with the displacement of the piston 6 or 6', a nonlinear relationship develops between the displacement and the flow rate corresponding to the illustrated curve 24. In the example, the displacement is therefore about 7 mm. The partial demagnetization is such that a progressive relationship is formed between the displacement and the output signal, which compensates for the influence of the spring characteristic corresponding to the curve 25. Thus, displacement of 7 mm results in an output signal of 5 volts. Consequently, the output signal of 5 volts corresponds to a flow rate of 100 liters per minute. At another illustrated operating point, wherein the flow rate is 200 liters per minute, there is a displacement of about 11 mm, but this displacement results in an output signal of only 10 volts. As a result, the desired linearization is achieved, i.e., the curve 26 representing the relationship between the output signal $U_A$ and the flow rate is a straight line rising with the rate of flow.

It will therefore be appreciated that the present invention provides a contactless flowmeter which is of simple design, but which has a constant measuring behavior over its entire measuring range, with the output signal of the flowmeter always being proportional to the rate of flow.

While specific embodiments of the invention have been shown and described, this was for purposes of illustration only, and not for purposes of limitation, the scope of the invention being in accordance with the following claims.

That which is claimed is:

1. A flowmeter for measuring the rate of flow of fluid in a housing having fluid inlet and outlet ports between which the fluid flows, and comprising a control collar mounted within said housing between said ports, a piston mounted for axial movement within said collar, biasing means for biasing said piston to a neutral position relative to said collar and having a spring characteristic, while permitting axial displacement of said piston relative to said collar in response to changes in the rate of flow of the fluid within said housing, said collar and said piston having cooperating wall surfaces which form a passageway between said collar and piston of increasing size as the piston moves from said neutral position in the direction of fluid flow, and displacement measuring and electric signal generator means for measuring said displacement of said piston and for generating an electric output signal having a substantially linear relationship to said rate of flow of said fluid, and comprising a sensor having a probe, and a magnetic rod movable adjacent said probe, said magnetic rod including physical means that varies along its length in such a manner that the quotient of said piston displacement and said output signal of said probe corresponds along said displacement of said piston to the quotient of said piston displacement and the flow rate at all positions of said piston displacement in such a manner that the influence of the spring characteristic of said biasing means on the output signal of said probe is compensated and a linear relationship exists between said output signal of said probe and the flow rate of the fluid.

2. A flowmeter as defined in claim 1 wherein the poles of said magnetic rod are aligned in the direction of its movement.

3. A flowmeter as defined in claim 1 wherein said cooperating wall surfaces of said collar and piston include a cylindrical peripheral wall portion which has at least one radial slot therethrough, with said slot being located adjacent one end of said peripheral wall portion so as to form said passageway between said collar and piston.

4. A flowmeter as defined in claim 3 wherein said cylindrical peripheral wall portion includes at least one of said radial slots adjacent each of the opposite ends thereof, and such that a passageway between said collar and piston of increasing size is formed as the piston moves in either direction from said neutral position, and so as to permit flow measurement in either direction.

5. A flowmeter as defined in claim 1 wherein said piston is movably mounted within said collar by means of an axial rod which is fixed to said piston, and said biasing means includes a coil spring encircling said rod and extending between said piston and said housing.

6. A flowmeter as defined in claim 5 wherein said displacement measuring and electric signal generating means comprises a magnetic end portion fixed to said rod, and probe means fixed to said housing adjacent said magnetic end portion for generating an electric signal representative of the axial positioning of said magnetic end portion.

7. A flowmeter as defined in claim 1 wherein said physical means comprises the cross-section of said magnetic rod.

8. A flowmeter as defined in claim 1 wherein said physical means comprises the magnetization of said magnetic rod.

9. A flowmeter as defined in claim 1 wherein said physical means comprises the partial and homogeneous magnetization of said magnetic rod.

10. A flowmeter as defined in claim 1 wherein said physical means comprises a curvature of said magnetic rod along its length so as to change its distance from said probe of said sensor during said axial displacement of said piston.

11. A flowmeter for measuring the rate of flow of fluid in a housing having a fluid inlet port and a fluid outlet port, and comprising
   a control collar encircling the interior surface of said housing between said ports,
   a tubular piston encircled by and axially movable relative to said collar, said piston comprising a cylindrical peripheral wall portion and a transversely extending wall, and having at least one radial slot extending through said peripheral wall portion;
   biasing means biasing said piston toward a neutral position relative to said collar and having a spring characteristic, said piston being displaced from said neutral position by and in the direction of fluid flow between said ports, and with said radial slot being positioned to form a passageway between said collar and piston of increasing size as the piston moves from said neutral position in the direction of fluid flow, and
   displacement measuring and electric signal generating means for monitoring displacement of said piston from said neutral position, and for generating an electric output signal, said output signal being a nonlinear function of said displacement of said piston, and being a substantially linear function of said fluid flow rate, and comprising a sensor having a probe, and a magnetic rod movable adjacent said probe, said magnetic rod including physical means that varies along its length in such a manner that the quotient of said piston displacement and said output signal of said probe corresponds along said displacement of said piston to the quotient of said piston displacement and the flow rate at all positions of said piston displacement in such a manner that the influence of the spring characteristic of said biasing means on the output signal of said probe is compensated and a linear relationship exists between said output signal of said probe and the flow rate of the fluid.

12. A flowmeter for measuring the rate of flow of fluid in a housing having a fluid inlet port and a fluid outlet port, and comprising
   a control collar mounted within said housing between said ports, said collar including a tubular cylindrical wall portion, with said wall portion having one end facing in the direction of the flow of said fluid, and said one end of said wall portion having at least one radial slot therein,
   a piston mounted for axial movement with respect to said cylindrical wall portion,
   biasing means for biasing said piston to a neutral position within said cylindrical wall portion and having a spring characteristic, while permitting displacement of said piston axially of said cylindrical wall portion and against the force of said biasing means, and such that said slot forms a passageway between said collar and piston of increasing size as the piston moves from said neutral position in the direction of fluid flow, and
   displacement measuring and electric signal generating means for monitoring displacement of said piston from said neutral position, and for generating an electric output signal, said output signal being a nonlinear function of said displacement of said piston, and being a substantially linear function of said fluid flow rate, and comprising a sensor having a probe, and a magnetic rod movable adjacent said probe, said magnetic rod including physical means that varies along its length in such a manner that the quotient of said piston displacement and said output signal of said probe corresponds along said displacement of said piston to the quotient of said piston displacement and the flow rate at all positions of said piston displacement in such a manner that the influence of the spring characteristic of said biasing means on the output signal of said probe is compensated and a linear relationship exists between said output signal of said probe and the flow rate of the fluid.

* * * * *